US012535087B2

(12) United States Patent
Cote et al.

(10) Patent No.: US 12,535,087 B2
(45) Date of Patent: Jan. 27, 2026

(54) REGENERATIVE PUMPING SYSTEM AND METHOD

(71) Applicant: ARTIFICIAL LIFT PRODUCTION INTERNATIONAL CORP., Cochrane (CA)

(72) Inventors: Brennon Leigh Cote, Cochrane (CA); Derek Lorne Twidale, Cochrane (CA); David Paul Dyck, Cochrane (CA)

(73) Assignee: ARTIFICIAL LIFT PRODUCTION INTERNATIONAL CORP. (CA)

( * ) Notice: Subject to any disclaimer, the term of this patent is extended or adjusted under 35 U.S.C. 154(b) by 0 days.

(21) Appl. No.: 18/585,875

(22) Filed: Feb. 23, 2024

(65) Prior Publication Data

US 2025/0270910 A1 Aug. 28, 2025

(51) Int. Cl.
*F15B 9/04* (2006.01)
*F15B 15/28* (2006.01)

(52) U.S. Cl.
CPC ............ *F15B 9/04* (2013.01); *F15B 15/2838* (2013.01); *F15B 15/2884* (2013.01)

(58) Field of Classification Search
CPC ..... F15B 9/04; F15B 15/2838; F15B 15/2884
See application file for complete search history.

(56) References Cited

U.S. PATENT DOCUMENTS

| | | | | |
|---|---|---|---|---|
| 5,647,208 | A | 7/1997 | Spitzbarth et al. | |
| 5,827,051 | A | 10/1998 | Smith | |
| 6,463,009 | B1 * | 10/2002 | Nagai | G01S 7/524 367/902 |
| 7,234,298 | B2 | 6/2007 | Brinkman et al. | |
| 8,523,533 | B1 * | 9/2013 | Best | F04B 1/32 417/904 |
| 2009/0077957 | A1 * | 3/2009 | Noble | F15B 15/204 417/404 |
| 2017/0363077 | A1 * | 12/2017 | Gisolf | F04B 47/02 |
| 2024/0309890 | A1 * | 9/2024 | Chithravelpillai | F15B 1/024 |

FOREIGN PATENT DOCUMENTS

| | | | | |
|---|---|---|---|---|
| WO | 2013/093511 | A1 | 6/2013 | |
| WO | WO-2016043347 | A1 * | 3/2016 | B01D 53/94 |
| WO | WO-2019091512 | A1 * | 5/2019 | |
| WO | WO-2021259981 | A1 * | 12/2021 | F15B 15/2838 |

OTHER PUBLICATIONS

WO2021259981A1 machine translation thereof (Year: 2021).*

* cited by examiner

*Primary Examiner* — Matthew Wiblin
(74) *Attorney, Agent, or Firm* — Field LLP; Shohini Bagchee

(57) ABSTRACT

A system is provided for determining piston position and for monitoring and maintaining stroke rate in a hydraulic lift system comprising a lift cylinder, a reversible hydraulic pump, a motor and a flywheel. A method is further provided for managing energy requirements of a hydraulic lift system comprising a lift cylinder, a reversible hydraulic pump, a motor and a flywheel.

6 Claims, 10 Drawing Sheets

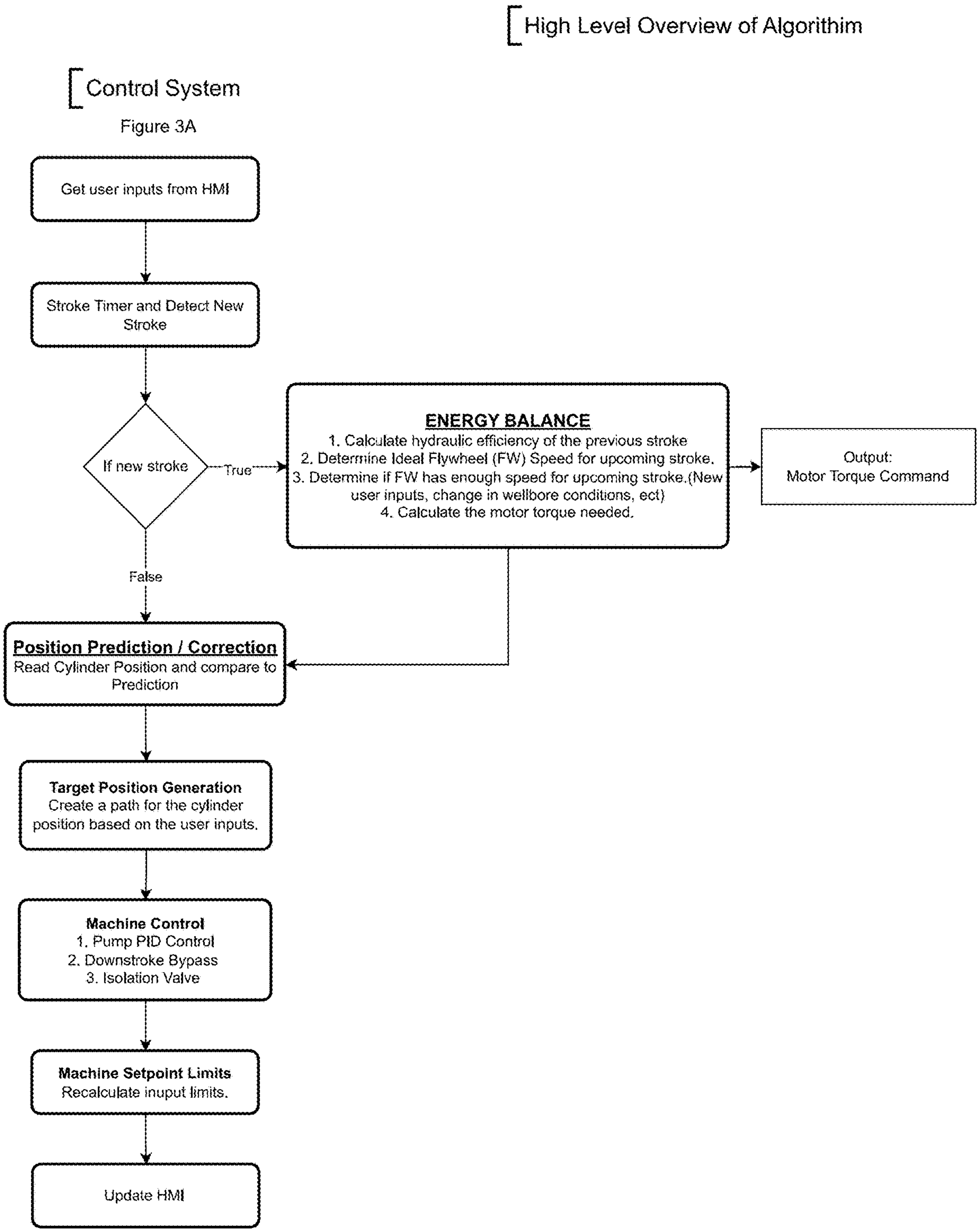
High Level Overview of Algorithim
Control System
Figure 3A
Get user inputs from HMI
Stroke Timer and Detect New Stroke
If new stroke
True
False
ENERGY BALANCE
1. Calculate hydraulic efficiency of the previous stroke
2. Determine Ideal Flywheel (FW) Speed for upcoming stroke.
3. Determine if FW has enough speed for upcoming stroke.(New user inputs, change in wellbore conditions, ect)
4. Calculate the motor torque needed.
Output:
Motor Torque Command
Position Prediction / Correction
Read Cylinder Position and compare to Prediction
Target Position Generation
Create a path for the cylinder position based on the user inputs.
Machine Control
1. Pump PID Control
2. Downstroke Bypass
3. Isolation Valve
Machine Setpoint Limits
Recalculate inuput limits.
Update HMI

PLUNGER COMPRESSED

PLUNGER UNCOMPRESSED

REGENERATIVE PUMPING SYSTEM AND METHOD

FIELD

The present disclosure relates to a improvements to regenerative pumping systems in connection with artificial lift.

BACKGROUND

In oil production, oil and liquid hydrocarbons are often raised to surface using systems called artificial lift systems. The systems typically use a downhole pump to pump liquid hydrocarbon from underground formations in a cased wellbore up to surface. A piston on the downhole pump is connected via a rod string to an actuator at the surface to thereby reciprocate the piston of the downhole pump to raise fluid to surface. The actuation used to create the reciprocating motion can be done in several ways, the most common being the classic mechanical pumpjack.

The reciprocating motion can also be achieved by a hydraulic pumpjack, comprised of a lift cylinder and a power unit. A piston of the hydraulic lift cylinder is threadably connected to the rod string. Hydraulic fluid and pressure applied to one side of the piston serves to raise the lift cylinder piston, the rod string, and the piston of the downhole pump, in turn lifting the fluids, on the upstroke. On the downstroke, the cylinder piston lowers with weight of the rod string and the downhole pump piston is lowered within the downhole pump.

Piston stroke speed and piston position, which directly relate to downhole pumping speed, is a very important aspect and measure of the efficiency and rate of production of the well. Therefore tracking piston stroke speed and position can assist with ensuring that piston stroke speed is meeting requirements for piston strokes per minute and daily production quotas.

A motor powers a hydraulic pump capable of delivering the hydraulic fluid from a hydraulic reservoir to lift the lift cylinder in the upstroke. Gravity and downward motion of the rod string channels fluid from the lift cylinder in the downstroke, requiring no motor power on the downstroke.

Various techniques have been examined for collecting power from the downstroke for adding to motor power on the upstroke:

U.S. Pat. No. 5,647,208A teaches a flywheel-motor-hydraulic pump arrangement in which a swash plate of the hydraulic pump controls the operation of the hydraulic pump in pump (upstroke) or motor (downstroke) mode. The swash plate and corresponding control system also control the speed of the hydraulic pump in both modes. U.S. Pat. No. 7,234,298B2 teaches a dual hydraulic pump/loop system in which one hydraulic pump/loop is used on the upstroke and another is connected to the flywheel on the downstroke. U.S. Pat. No. 5,827,051 teaches a regenerative hydraulic power transmission system including means to reverse flow of hydraulic fluid through the hydraulic pump and an inertial assist for the power source that gathers energy in the downstroke and utilizes the gathered energy to power the upstroke. WO2013/093511 teaches a hydraulic system including a flywheel connected to a hydraulic pump for powering a hydraulic actuator.

However, most systems experience significant loss of efficiencies, as well as speed limitations for both the hydraulic pump and the motor. As well many systems require complex energy capture systems, which are expensive and hard to manage, as well as present further losses in energy capture efficiency.

A need further exists for more precise tracking and control of regenerative pump systems to ensure flywheel speed is being optimized, and that piston stroke rate is meeting production requirements.

SUMMARY

A system is provided for determining piston position and for monitoring and maintaining stroke rate in a hydraulic lift system comprising a lift cylinder, a reversible hydraulic pump, a motor and a flywheel. The system comprises an ultrasonic sensor located on an upstroke side of a piston of the lift cylinder for providing piston position data; and a computer implemented program for conducting the steps of:

i. estimating a position of the piston from swash plate position data of a swash plate of the hydraulic pump and from speed of the motor;
ii. estimating, from pump pressure data, a flow rate of fluid lost to the system through internal leakage in the pump;
iii. correcting, using the leakage-compensated estimated fluid flow rate and from dimensions of the lift cylinder, any inaccuracies in the estimated position of the piston; and
iv. receiving position data from the ultrasonic sensor and comparing with the corrected estimated position of the piston.

If the ultrasonic sensor piston data is determined to be erroneous, or if no reading is available from the ultrasonic sensor, then the estimated piston position is adopted as the correct piston position.

A method is further provided for managing energy requirements of a hydraulic lift system comprising a lift cylinder, a reversible hydraulic pump, a motor and a flywheel.

The method comprises the steps of:

a. detecting a new stroke of a piston of the lift cylinder;
b. determining an optimal flywheel speed for the stroke, optimal flywheel speed being a minimum speed setpoint at which capacity of the hydraulic pump is not exceeded at any point in the stroke;
c. applying a design margin to the optimal flywheel speed;
d. determining:
   i. if the motor has sufficient power to reach the optimum flywheel speed during the piston stroke, then
   ii. setting parameters of new piston stroke as defined by user's inputs; or
   iii. if the motor power is insufficient to reach the optimum flywheel speed, then
   iv. setting a target flywheel speed to the optimum flywheel speed, and setting parameters of the new piston stoke to match parameters from a previous stroke; and
e. repeating steps a. through d. until the motor power is sufficient to reach the flywheel optimum speed.

A system is further provided for managing energy requirements of a hydraulic lift system comprising a lift cylinder, a reversible hydraulic pump, a motor and a flywheel. The system comprises a computer implemented program for conducting the steps of the method of described above.

A back pumping piston for use in a piston-cylinder, comprising one or more oil intake holes formed in a body of the back pumping piston; a central bore within the back pumping piston in fluid communication with the one or more oil intake holes, said central bore including a high-pressure seal; a high-pressure cavity in fluid communication with the central bore and comprising a check valve to selectively prevent outflow of oil from the high-pressure cavity; a low-pressure cavity defined at a lower end by a plunger and being in fluid communication with a gas chamber above the back pumping piston; and a return spring connected to the plunger to bias the plunger into the low-pressure cavity; Receipt of compressed gas from the gas chamber above the piston into the low-pressure cavity serves to overcome the bias force of the return spring and to lower the plunger through the central bore until a lower end of the plunger engages with the high-pressure seal, thus sealing off the oil intake holes and preventing exit of oils through the oil holes and compressing oils within the high-pressure cavity until oil pressure within the high-pressure cavity is sufficient to overcome the check valve, allowing oils to pass through the check valve and out into a hydraulic oil circuit.

A rod seal assembly is also provided, for use with a rod connected to a piston-cylinder of an artificial lift system, said rod having multiple rod seals and an oil scraper. The rod seal assembly comprises:

a. a gas inlet connection connectable to a pneumatic source for receiving compressed gas;
b. a gas inlet passage in communication with the gas inlet connection for receiving compressed gas and passing said compressed gas through oil holes formed in the rod seal gland of the rod seal assembly, to thus forcing out any oil within the oil holes; and
c. an oil outlet passage for receiving oil forced out of the oil holes and passing it through an oil outlet connection connectable to the gas volume above the piston in the cylinder.

The oil outlet passage is sized such that, once the oil outlet passage is filled with oil, any gas pushing the oil is prevented from bypassing the oil to the oil outlet connection.

A hydraulic lift system is further provided, comprising a lift cylinder, a reversible hydraulic pump, a motor and a flywheel, wherein said system comprises downstroke bypass valve in fluid communication with a lower chamber of the lift cylinder, said downstroke bypass valve being openable to allow hydraulic fluid from the lower chamber of the lift cylinder to bypass the hydraulic pump and flow directly to a reservoir.

It is to be understood that other aspects of the present disclosure will become readily apparent to those skilled in the art from the following detailed description, wherein various embodiments of the disclosure are shown and described by way of illustration. As will be realized, the disclosure is capable of other and different embodiments and its several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

A further, detailed, description of the disclosure, briefly described above, will follow by reference to the following drawings of specific embodiments of the disclosure. The drawings depict only typical embodiments of the disclosure and are therefore not to be considered limiting of its scope. In the drawings:

FIG. 3A is a schematic diagram of a control and feedback system of the present disclosure;

The drawings are not necessarily to scale and in some instances, proportions may have been exaggerated in order to more clearly depict certain features.

DETAILED DESCRIPTION

The description that follows and the embodiments described therein are provided by way of illustration of an example, or examples, of particular embodiments of the principles of various aspects of the present disclosure. These examples are provided for the purposes of explanation, and not of limitation, of those principles and of the disclosure in its various aspects.

Figure 1:
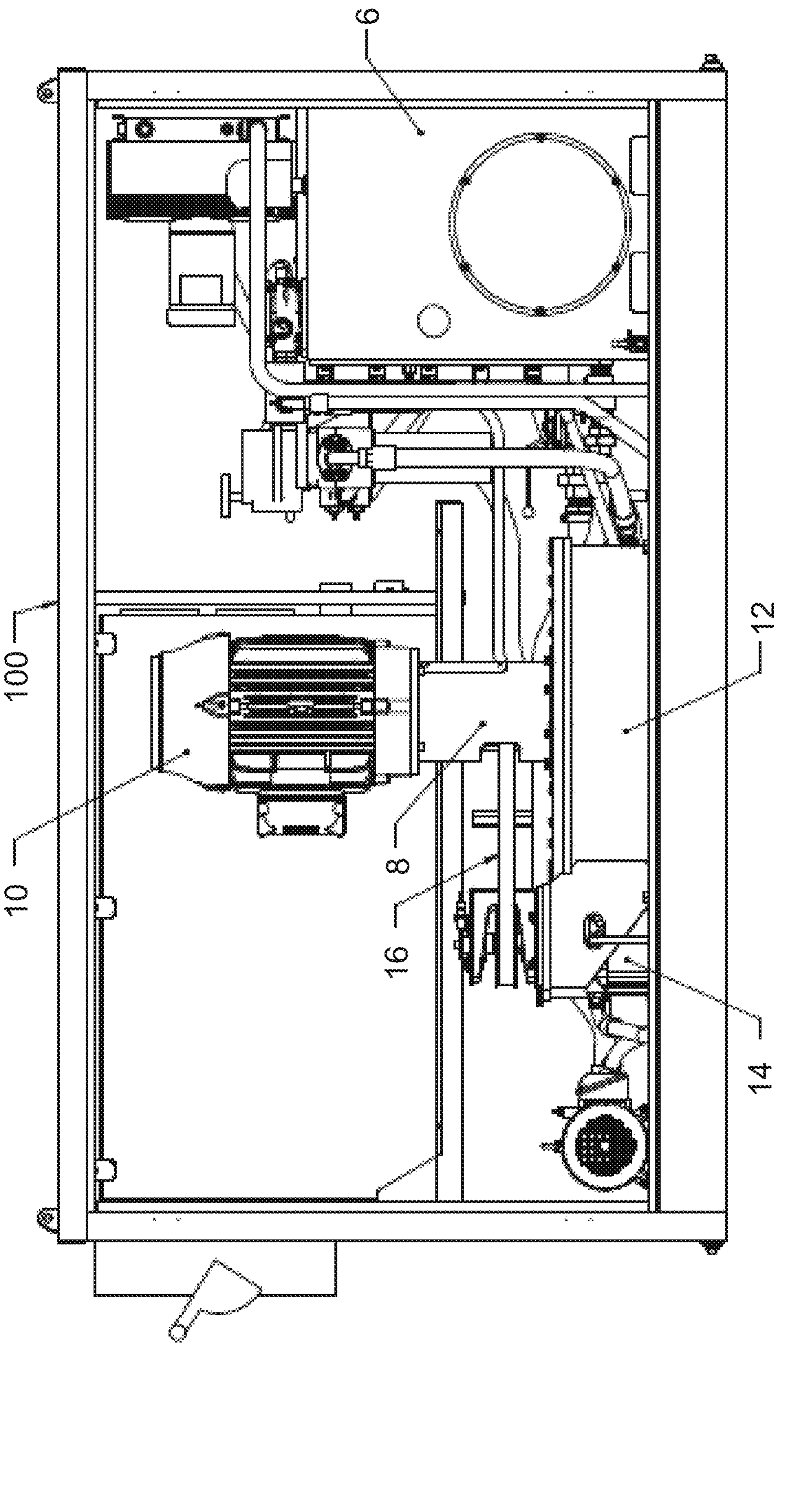
FIG. 1 is a perspective view of one embodiment of a system of the present disclosure.

With reference to FIGS. 1 and 2, the present disclosure relates to improvements in the control and efficiency of a hydraulic pumpjack which includes a regenerative system 100 working in relation to a hydraulic lift cylinder 18. An example of such a regenerative system 100 includes a motor or power source 10, a hydraulic pump 14 capable of delivering hydraulic fluid from a reservoir 6, through the isolation valve 15, to the hydraulic lift cylinder 18. The hydraulic pump 14 is reversible so as to channel fluid from the lift cylinder 18 in a cylinder downstroke, back to the reservoir 6.

The hydraulic pump 14 is preferably of an open-loop, over-center, electronic displacement control design which allows the hydraulic fluid to flow in both directions through the hydraulic pump 14 to and from the lift cylinder 18 and reservoir 6, creating the reciprocating motion of the hydraulic lift cylinder 18.

The present system 100 further includes a flywheel counterbalance 12 to collect energy on the downstroke. The flywheel counterbalance 12 is connected to the motor shaft 8 and the motor shaft 8 is connected to power the hydraulic pump 14 via a step-down/step-up system 16 such as a pulley sheave or a belt drive system. The arrangement allows the motor 10 to have only a single output shaft 8. A swash plate within the hydraulic pump 14 creates the reversibility, converting the hydraulic pump into a hydraulic motor on the cylinder downstroke, to rotate the flywheel 12 and transfer energy recovered from the down stroke, into the flywheel 12.

The motor 10 and flywheel 12 are preferably able to operate at a common, high speed. The hydraulic pump 14 can operate at a lower speed—the step-down/step-up system 16 acts as a transmission to step up or step down the speed depending on which direction fluid is travelling.

Figure 2A:
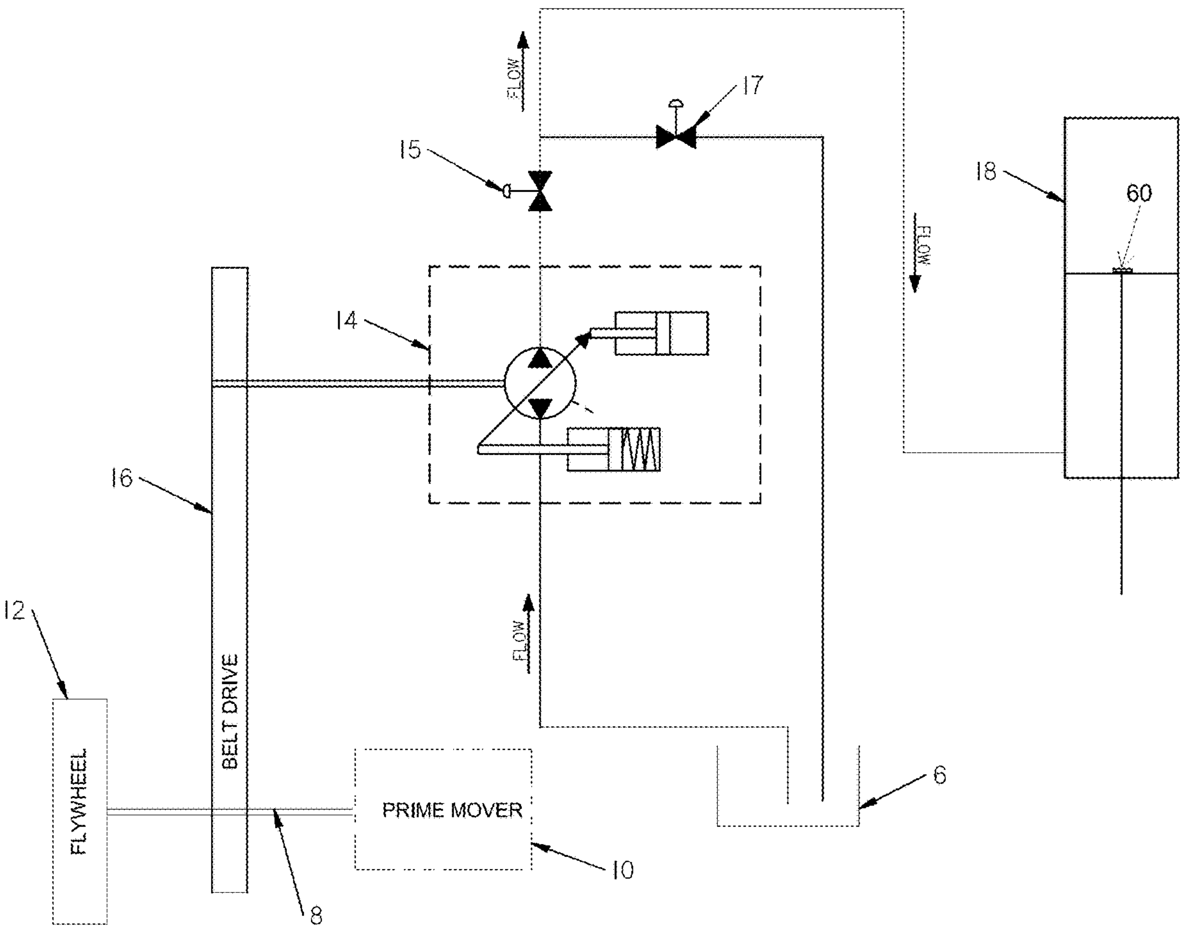
FIG. 2A is a schematic diagram of the system of FIG. 1, showing fluid flow in a cylinder upstroke.
Figure 2B:
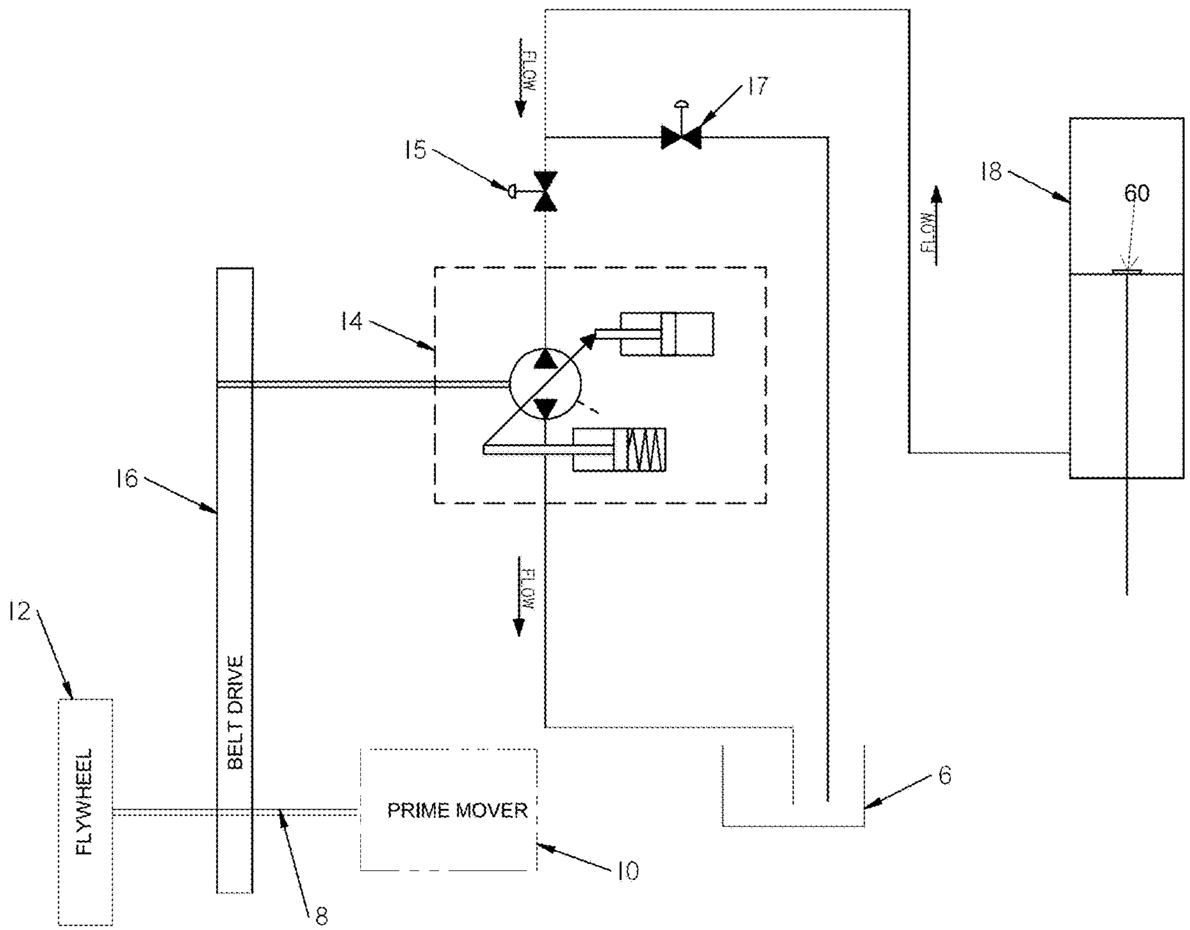
FIG. 2B is a schematic diagram of the system of FIG. 1, showing fluid flow in a cylinder downstroke.

In the present system 100, the motor 10 is directly connected to the flywheel 12 via motor shaft 8 while the hydraulic pump 14 is connected to the flywheel 12 and via step-down/step-up system 16. This allows the flywheel 12 and the hydraulic pump 14 to operate at different speeds. In the present open loop over-center pump circuit, as illustrated in FIGS. 2A and 2B, the hydraulic fluid travels from the reservoir 6, through the hydraulic pump 14, to the cylinder 18, and then is returned via the same set of piping to the reservoir 6 via the hydraulic pump 14, there is no requirement for separate sets of lines for sending fluid from reservoir to the lift cylinder vs sending fluid back to the reservoir from the lift cylinder.

In operation, on a first upstroke of the hydraulic lift cylinder 18, the motor 10 provides initial power to the system 100 to get the flywheel operating at an optimal speed. The flywheel, once operating at optimal speed, then powers the hydraulic pump 14 to pump fluid from reservoir 8 to lift a piston of hydraulic cylinder 18. The amount of energy that the motor 10 is required to supply to the system 100 for a particular stroke is calculated such that, at a bottom of a cylinder stroke, the flywheel 12 has reached a target speed. Energy may be input from the motor 10 into the system at any point in the stroke and the torque or power may vary during the stroke. Typically, the motor 10 inputs this energy as a constant torque or power throughout the entire stroke. The constant torque application equates to a constant current draw on the motor 10, ultimately minimizing power costs and peak current draw. As the flywheel 12 expends energy to lift the rod string, the energy required to lift the lift cylinder 18 is greater than the energy supplied by the motor 10 and the flywheel decreases in speed to a minimum speed at the top of stroke.

On the downstroke of the hydraulic cylinder 18, the swash plate in the hydraulic pump 14 reverses flow of fluid through the pump 14 and converts the pump 14 to hydraulic motor operation mode. The potential energy of the suspended rod string is used to pull the piston of the lift cylinder 18 down, driving the hydraulic pump 14, now in motor operation mode, taking advantage of the step up/step down system 16, to accelerate the flywheel 12 via shaft 8. Motor 10 continues to apply torque to the flywheel 12 also causing the flywheel 12 to accelerate. The combined application of energy by the motor 10 and the hydraulic pump 14 in hydraulic motor operation mode result in the flywheel 12 reaching its optimal speed.

The present hydraulic lift cylinder 18 is preferably a single acting, piston down design where the piston of the hydraulic cylinder 18 is directly connected to the rod string of the downhole pumping system. It should be noted that the current regenerative system 100 can be used with other hydraulic lift cylinder designs.

Control System

Figure 3B:
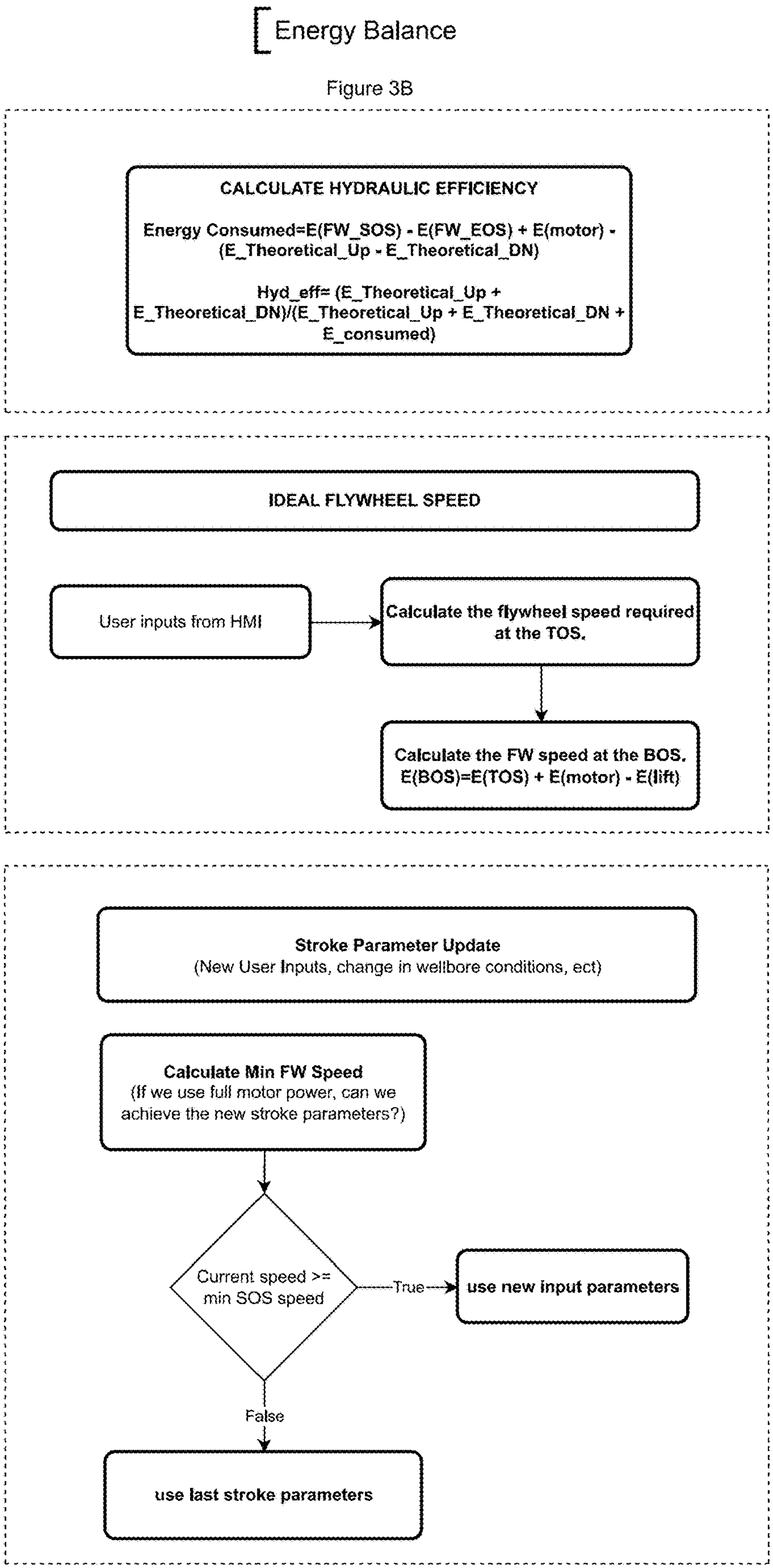
FIG. 3B is a schematic diagram of the energy balance and flywheel speed optimization methods of the present system.

With References to FIG. 3A an overall schematic diagram is provided for a method of controlling a hydraulic pumpjack with hydraulic lift cylinder 18. All of the steps performed in the methods of FIGS. 3A and 3B are programmed into either a local or remote programmable logic computer (PLC).

At startup the stroke position, stroke length and stroke rate are input into the control system from various sensors and by the operator via a human-machine-interface (HMI) that can be a computer, touchscreen or other suitable interface. A new stroke is detected when the cylinder 18 reaches its bottom of stroke position, when the stroke time has elapsed or when the control system is initially started. When a new stroke is detected then an Energy Balance is performed to ensure sufficient energy is being input by the motor 10 to meet the energy requirements of a next subsequent stroke. The Energy Balance methodology is illustrated in more detail in FIG. 3B and discussed in further detail below.

Energy Balance and Flywheel Speed Optimization

When a new stroke is detected, the present systems and methods perform an analysis to determine an optimal flywheel speed for the upcoming stroke. The optimal flywheel speed is defined as the minimum speed setpoint where the pump capacity will not be exceeded at any point in the stroke. A design margin may then be applied to the optimal flywheel speed. If the motor has sufficient power to reach the optimum speed during the stroke, the next stroke will occur as defined by the user's inputs, if the power is not sufficient then the target flywheel speed will be set to the optimum flywheel speed, as calculated above, and the stoke parameters from the previous stroke will be used. This method is repeated until the motor power is sufficient to reach the flywheel target speed. As a first step in the process, the energy consumed on the previous stroke and the hydraulic efficiency is calculated, as illustrated in FIG. 3B where:

E=energy
FW=flywheel
SOS=start of stroke
EOS=end of stroke
DN=down
Hyd_eff=hydraulic efficiency From that calculation, along with any new user inputs from the HMI regarding the cylinder stroke speed, stroke length, dwell times and stroke symmetry, the minimum flywheel speed at the top of the stroke can be calculated. Next, the minimum flywheel speed at the bottom of the stroke can be determined. A check is next performed in the method to determine if the motor can put enough energy into the flywheel on the next stroke to obtain the minimum flywheel speed at the bottom of the stroke. If this is confirmed then the new user inputs are immediately implemented. If the motor cannot put enough energy into the flywheel on the next stroke, the parameters from the last stroke are maintained with the new flywheel minimum speed setpoint until it is determined that the motor is able to put enough energy into the flywheel.

Figure 4:
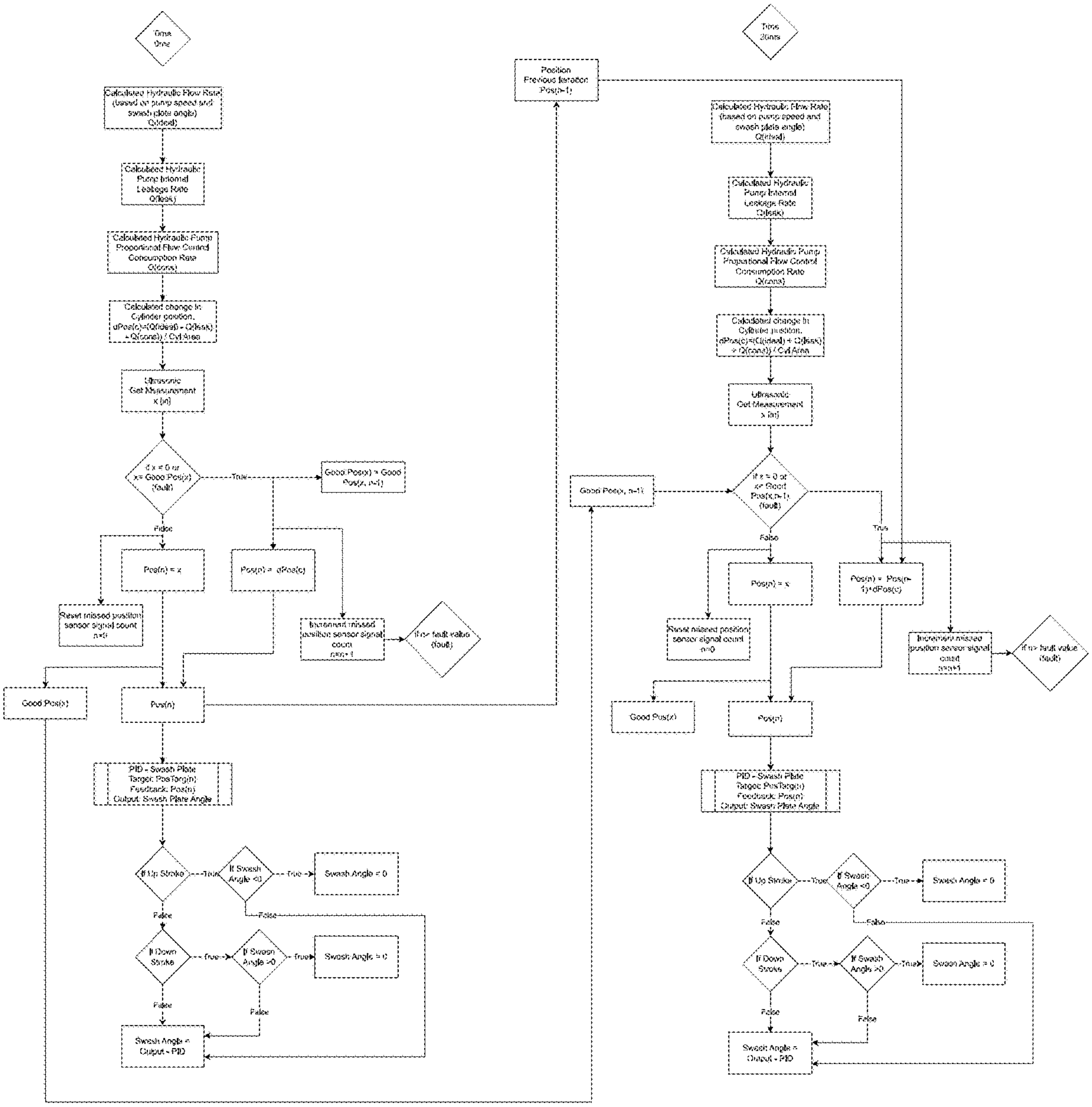
FIG. 4 logic flow diagram of a feedback and correction system in relation to measuring piston position in the present disclosure.

The lift cylinder position is then determined from the Position Prediction/Correction algorithm FIG. 4. This will be discussed in further detail below.

Position Read and Position Prediction and Correction

With reference to FIG. 4, the present disclosure further provides a prediction and correction system for making an accurate determination of the position of the lift cylinder piston as it is reciprocating within the hydraulic cylinder. Piston position determination is used by the Control System of the present system, as feedback to determine if the cylinder is correctly following the target piston position generated by the calculated cylinder piston path.

There are several known methods of measuring the position of a piston of a hydraulic cylinder while it is in motion. These generally involve using some type of linear position sensor such as a hall effects type sensor with a sensing rod and a magnet on the moving portion to measure position.

These types of sensor work well over short cylinder stroke lengths, but over longer stroke lengths they become less reliable, impractical to install or replace, and cost prohibitive. Another method is to use a flow meter to monitor the amount of hydraulic fluid pumped into the cylinder and make an estimate of the position using the dimensions of the cylinder. The issue with this method is that inaccuracy of the flow meters lead to a constant drift between the actual position of the piston and the estimated position. More accurate flow meters could be utilized but they become cost prohibitive as well. Another problem with all of these methods is that any erroneous reading from the position sensor or flow meter can result in erratic behavior from the cylinder control system and any momentary loss of signal will cause a system fault and result in a shut-down.

The present disclosure provides piston position sensing in the form of a non-contact ultrasonic sensor 60. The ultrasonic distance sensor is installed in the end of the cylinder to sense the position of the piston inside the cylinder. These ultrasonic sensors are compact, accurate and cost effective. One issue with ultrasonic sensors is that they can become less accurate at high pressures, and cease to work at very low pressures, such as those pressures experienced with the lift cylinder at the top of an upstroke or bottom of a downstroke respectively.

Simultaneous to position sensing by the ultrasonic sensor, the present prediction and correction system calculates an estimated position of the piston using swash plate position data from a position sensor on the hydraulic pump 14 swash plate, and data from the speed of the motor 10 to predict the nominal amount of fluid passing through the pump 14. This estimated position of the lift cylinder piston is made more accurate by using pump pressure sensors to accurately estimate the flow rate of fluid lost to the system through internal leakage in the pump as well as the pump and other control valves in the system. This leakage compensated flow rate is used with the dimensions of the cylinder to calculate the estimated position of the piston.

Software within the present system analyzes the reading from the ultrasonic sensor and compares it with the estimated position as calculated above based on swash plate position and motor speed. Based on the comparison, if the system determines the ultrasonic sensor result to be erroneous, or if for any reason there is no reading from the ultrasonic sensor, then the present system uses the estimated position instead. This eliminates faults and data gaps that can occur from momentary loss of signal from the ultrasonic sensor or erratic behavior of the ultrasonic sensor as increased pressure is experienced in the upstroke or decreased pressure is experienced in the down stroke.

Although an ultrasonic sensor is used in the preset disclosure, it should be noted that this system would work to verify data from any position sensor.

The target piston position at any given time is calculated for each iteration of the control cycle based on a targeted path of piston travel, which in turn is calculated from the target stroke rate, stroke length, dwell time at top of stroke and bottom of stroke respectively, and ratio of down stroke time to up stroke time. The accelerations at the top and bottom of each stroke may be calculated in several ways, including sinusoidal position and constant acceleration. A control system, labeled Control in FIG. 3A, compares the piston position from the Position Read and Error Check method and system and uses a proportional-integral-derivative (PID) controller to send signals to the hydraulic pump swash plate control valves and downstroke bypass valve to move the lift cylinder piston position to follow the target position path.

In the Setpoint Limits step of the overall control system and method, a calculation is performed for the limit of every input in the system. These are dynamic limits, based on the current operating conditions and any new user inputs, so they must be re-calculated every iteration. These limits are then updated in the PLC.

The HMI is then updated with updated piston position, speed and efficiency data, as well as physical operating conditions (oil temp, hydraulic pressure, filter status, bearing temps, cooler status, circulating pump status).

Back Pumping Piston

In the movement of most piston-cylinders, there is often at least some transfer of hydraulic oil that tends to form an oil film between the high-pressure and low-pressure sides of the piston seals. This oil film builds up over time until there is a small volume of oil on top of the piston. In such cases the ultrasonic sensor 60 is not able to tell the difference between the top of the piston itself and the top of this oil volume level and tends to misread the position of the piston by the amount of the oil level on top of the piston. In order to remove the oil volume from on top of the piston, a back pumping piston 80 has been developed.

Figure 5C:
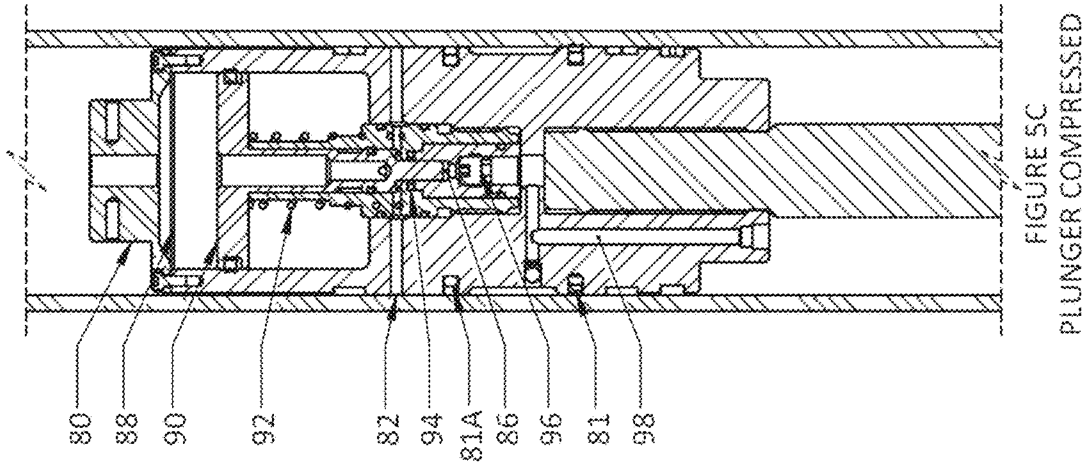
FIG. 5C is a cross-sectional elevation view of the back pumping piston of FIG. 5A, in a compressed state.
Figure 5B:
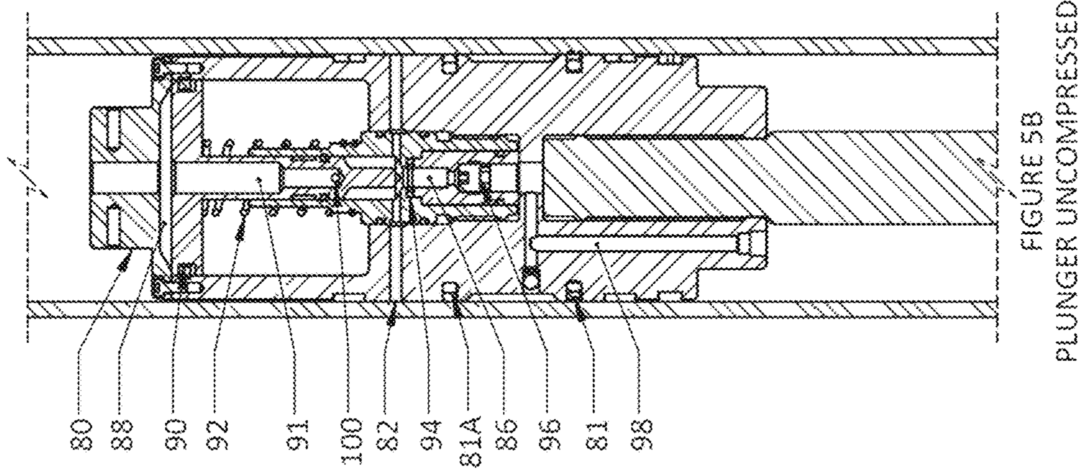
FIG. 5B is a cross-sectional elevation view of the back pumping piston of FIG. 5A, in an uncompressed state.
Figure 5A:
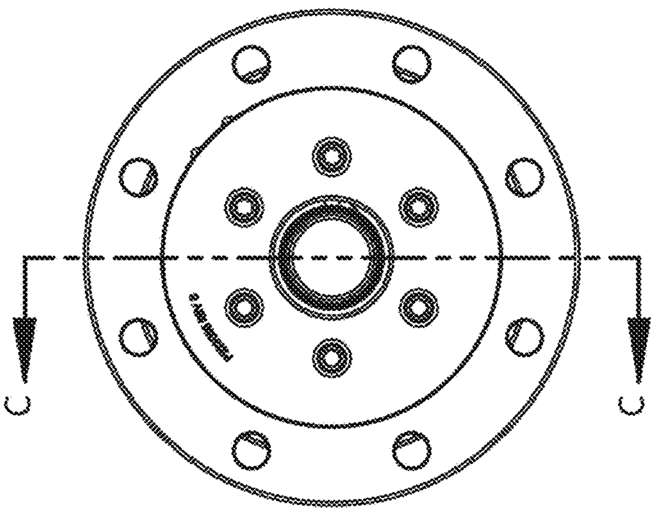
FIG. 5A is a top end view of a back pumping piston of the present disclosure.

With reference to FIGS. 5A to 5C, the back pumping piston 80 works on the principle of applying a low pressure to a large area that is in turn used to create a much higher pressure in another, smaller area. The area ratio that is practical for this back pumping piston 80 is between approximately 10:1 and 400:1 and more preferably about 280:1.

In operation, on the up stroke of the back pumping piston 80, the oil film that has passed the piston seals 81 is wiped by the top seal 81A into the oil intake holes 82 in the piston body. The oil flows from the oil intake holes 82 and the central bore 91 of the plunger 90 into a bore of a central component 84 of the back pumping piston 80. Oil travels past a high-pressure seal 94 and enters a high-pressure cavity 86. The high-pressure cavity 86 is open at the oil entry end so that the oil can easily fill it without trapping gas bubbles. A check valve 96 selectively prevents outflow of oils from the high-pressure cavity through a high-pressure exhaust 98 beyond.

A low-pressure cavity 88 is also present in the back pumping piston 80 and is defined at a lower end by a plunger 90. The plunger 90 is biased into the low-pressure cavity 88 by a spring 92, the spring being on one side of the plunger 90 and the low-pressure cavity 88 being on another. As the back pumping piston 80 travels upwards gas above the back pumping piston 80 within the cylinder (not shown) begins to compress and once the gas pressure above the back pumping piston 80 exceeds a pressure in the low-pressure cavity 88, a pre-load force of the spring 92 is overcome and the plunger 80 begins to move downwards, thereby enlarging a volume of the low-pressure cavity 88.

A lower end of the plunger 90 engages with the high-pressure seal 94, thus sealing off the oil intake holes 82 and preventing their re-exit out of the piston 80 and back out to the rest of the cylinder (not shown).

The oils inside the high-pressure cavity 86 are then compressed by the lower end of plunger 90. As the piston 80 continues to rise in the cylinder, and as gas pressure in the low-pressure cavity 88 builds, the plunger 90 continues to lower and the pressure inside of the high pressure cavity 86 also increases until the pressure in the high-pressure cavity 86 becomes greater than a pressure on the other side of the check valve 96 allowing the oils inside the high pressure cavity 88 to pass through the check valve 96, out of the high pressure exhaust 98 and back into the hydraulic oil circuit (not shown).

When the piston 80 travels back to the bottom of the stroke, gas pressure in the low-pressure cavity 88 is reduced and the spring 92 biases the plunger 90 to its original position. The return spring 92 is sized so that it can pull the plunger from the high-pressure cavity 86 against full vacuum pressure of the exhaust which enables the piston 80 to operate with a single check valve 96 and not the typical two required for most intensifiers. It would, of course, be well understood by a person of skill in the art, that a dual check valve arrangement would work equally as well with the present system. A regulator provides a means of ensuring that pressure above the piston is low enough so as to not interfere with the ultrasonic sensor 60, while also ensuring enough pressure for the back pumping piston 80 to operate.

The back pumping piston 80 allows for oil to be easily pumped from the top of the piston 80 at the top of stroke and back to the hydraulic oil circuit, even when the hydraulic oil circuit is operating at its maximum pressure. The high-pressure cavity 86 is sized to have an un-swept length similar to or greater than the swept length. This is done so that if any gas is present in a significant amount within the high-pressure cavity 86, then the lower end of the plunger 90 will compress that gas but be unable to force it through the check valve 96 and into the hydraulic oil circuit. The high-pressure cavity 86 is also vertically oriented so that any entrapped gas will preferentially rise and leave the high-pressure cavity 86 and exit through upper oil intake holes 100 formed in the plunger 90.

Rod Seal Design

A common issue with the hydraulic cylinder in hydraulic pumping units is that there is a small amount of hydraulic fluid or oil that bypasses the rod seals in the form of an oil film that is difficult to remove completely with the rod seals. With existing rod seals it is possible to partially back pump this oil film back into the hydraulic oil circuit, using specific seal profiles however they are not 100% effective.

The present rod seal design uses a pneumatic-over-hydraulic pumping system in combination with a scraper to remove the oil film from the rod and pump it into the un-swept volume of the cylinder where it is pumped back into the hydraulic oil circuit using the back pumping piston 80 configuration described above. The present rod seal design is made up of two separate assemblies shown in FIGS. 6A/6B and in FIGS. 7A/7B respectively.

Figure 6B:
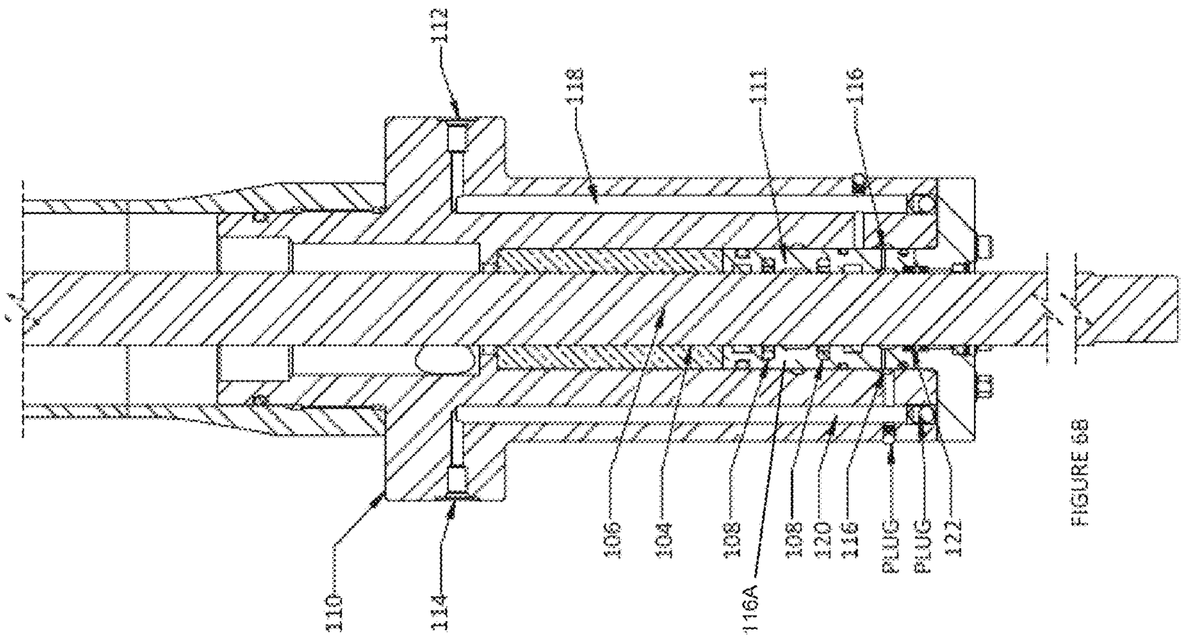
FIG. 6B is a cross-sectional elevation view of the rod seal assembly of FIG. 6A.
Figure 6A:
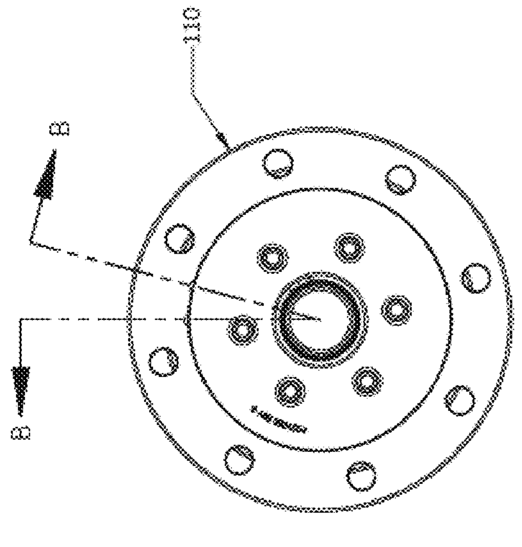
FIG. 6A is a top plan view of a rod seal assembly of a rod seal oil return system of the present disclosure.

With reference to FIGS. 6A and 6B, a rod seal assembly 110 is illustrated with a rod 106 of the rod string and multiple rod seals 108 and an oil scraper 122.

A gas inlet connection 112 of the rod seal assembly 110 is connectable to the gas volume in the cylinder (not shown) above the piston 80 using a first tube (not shown). An oil outlet connection 114 is also connectable to the gas volume above the piston 80 using a second tube (not shown). When the gas pressure above the piston 80 rises during an upstroke of the piston 80, gas is forced along the first tube into the gas inlet connection 112, via a gas inlet passage 118 and through oil holes 116 formed in the rod seal gland 111 of the rod seal assembly 110. The oil holes 116 are in communication with a cavity 116A that surrounds the rod 106. If there is oil inside the oil holes 116 it will be forced through them and into the oil outlet passage 120. The oil outlet passage 120 is sized such that, given the viscosity of the oil, once the oil outlet passage 120 is filled with oil, the gas pushing the oil will not easily bypass the oil, but instead carries the oil into an inlet 132 of the pumping assembly 130.

Figure 7A:
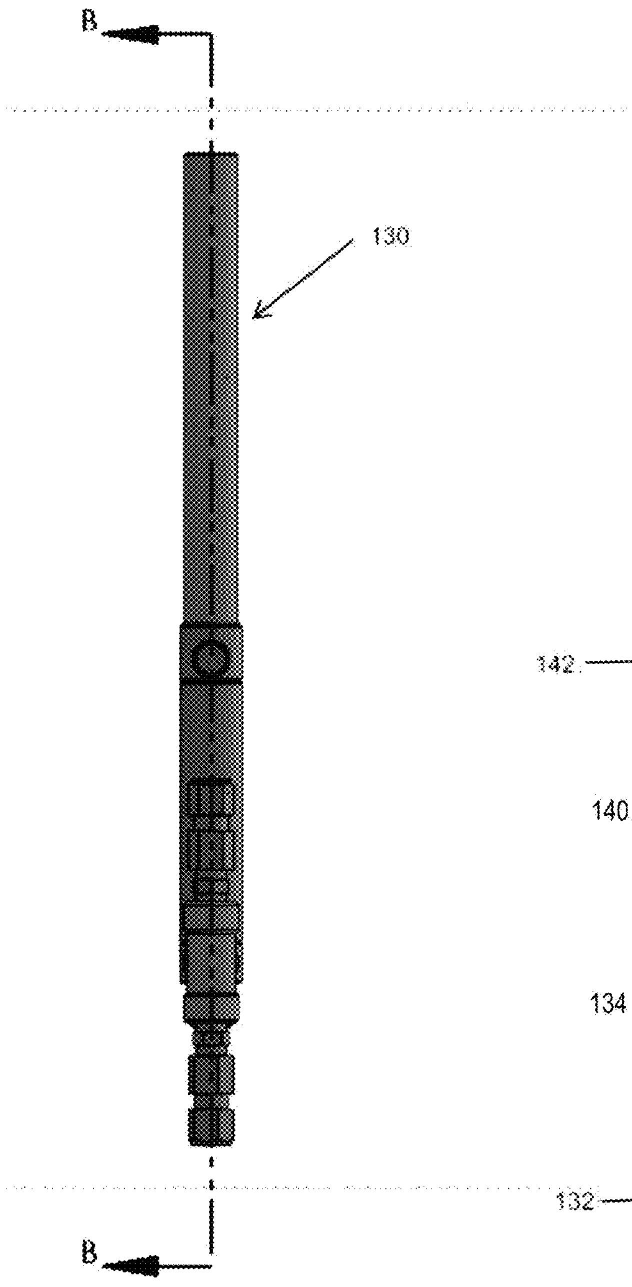
FIG. 7A is a front elevation view of a pumping assembly of the rod seal oil return system.
Figure 7B:
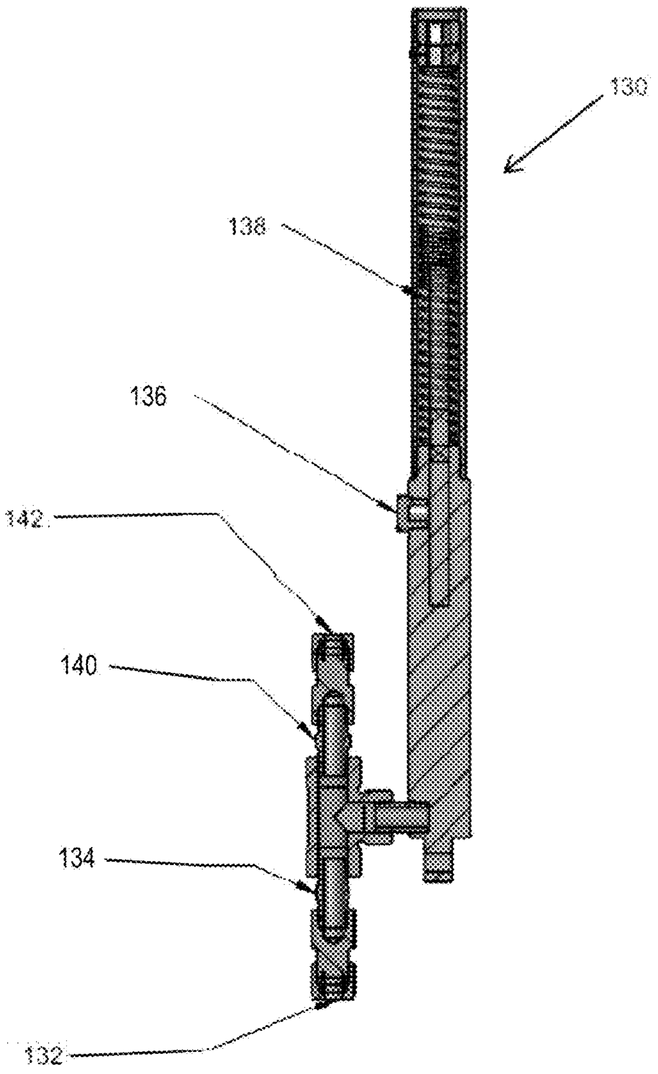
FIG. 7B is a side cross-sectional elevation view of the pumping assembly of FIG. 7A.
Figure 7C:
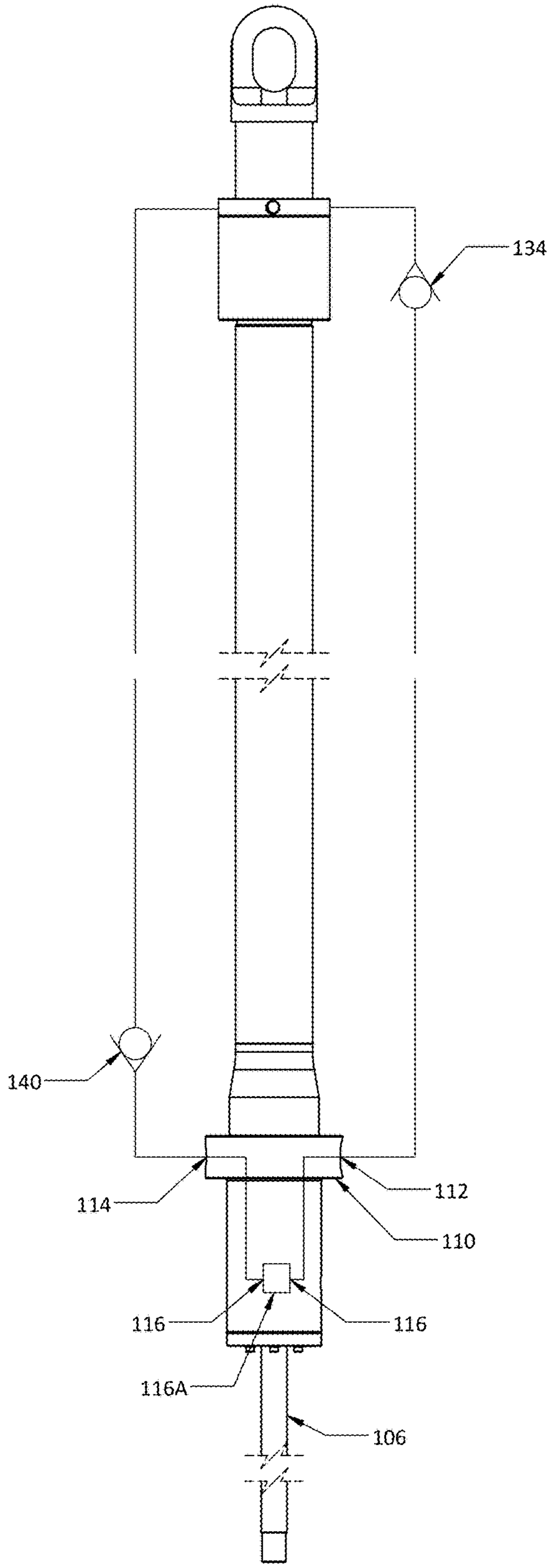
FIG. 7C is circuit diagram of the rod seal oil return system.

The pumping assembly 130 is shown in FIGS. 7A, 7B and 7C. The oil passes a first check valve 134 and flows into a single acting cylinder 136 which is caused to extend and in turn to compress a return spring 138 connected to a distal end of the single acting cylinder 136. When the pressure above the piston 80 decreases on the down stroke the return spring 138 is allowed to extend, and in turn forces the single acting cylinder 136 to compress the fluids inside of it and push them through the second check valve 140 and out an outlet 142 which connects to the oil outlet connection 114 that returns the oil to the cylinder tube above the piston 80. This cycle continues removing unwanted oil from the cavity 116A between the oil scraper 122 and the rod seals 108.

Downstroke Bypass Valve

During the downstroke of the piston within the cylinder 18, wellbore conditions may allow the downhole pump to fall faster than the surface hydraulic pump 14 will allow. If this is the case and an increase in pumping speed is required, a downstroke bypass valve 17 can be opened to allow some of the hydraulic fluid returning from a lower chamber of the cylinder 18 to bypass the hydraulic pump 14 and flow directly to the reservoir 6, thereby allowing for the increasing the velocity of the downstroke.

The previous description of the disclosed embodiments is provided to enable any person skilled in the art to make or use the present disclosure. Various modifications to those embodiments will be readily apparent to those skilled in the art, and the generic principles defined herein may be applied to other embodiments without departing from the spirit or scope of the disclosure. Thus, the present disclosure is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A computer implemented method for determining piston position and for monitoring and maintaining stroke rate in a hydraulic lift system comprising a lift cylinder, a reversible hydraulic pump having a swash plate, a motor, a flywheel, and an ultrasonic sensor located on an upstroke side of a piston of the lift cylinder for providing a sensed piston position;

said computer implemented method comprising the steps of:

i. predicting a nominal amount of fluid passing through the hydraulic pump, from swash plate position data of the swash plate of the hydraulic pump and from a speed of the motor;

ii. estimating, from pump pressure data, a flow rate of fluid lost to the system through internal leakage in the pump;

iii. compensating the nominal fluid flow through the hydraulic pump by the flow rate of fluid lost to the system through internal leakage to determine a leakage-compensated fluid flow;

iv. determining, using the leakage-compensated fluid flow through the hydraulic pump and from dimensions of the lift cylinder, an estimated position of the piston;

v. receiving the sensed piston position from the ultrasonic sensor and comparing the sensed piston position with the estimated position of the piston; and vi. adopting, if the sensed piston position is determined to be not following a target piston position or not available from the ultrasonic sensor, the estimated piston position as the piston position.

2. The computer implemented method of claim 1, further comprising the steps of:

comparing the piston position at a given time to the target piston position along a target position path at that given time; and sending a signal to control valves of the swash plate and to a downstroke bypass valve to move the lift cylinder piston position to follow the target position path.

3. The computer implemented method of claim 1, further comprising the steps of:

a. detecting a new stroke of the piston of the lift cylinder;

b. determining an optimal flywheel speed for the new stroke, the optimal flywheel speed being a minimum speed setpoint at which capacity of the hydraulic pump is not exceeded at any point in the new stroke;

c. applying a design margin to the optimal flywheel speed;

d. determining:

i. if the motor has sufficient power to reach the optimal flywheel speed during the new stroke, then ii. setting parameters of the new stroke as defined by user's inputs; or iii. if the motor power is insufficient to reach the optimal flywheel speed, then iv. setting a target flywheel speed to the optimal flywheel speed, and setting the parameters of the new stoke to match parameters from a previous stroke; and e. repeating steps a. through d. until the motor power is sufficient to reach the flywheel optimum speed.

4. The method of claim 3, further comprising the following step prior to step a.:

a. calculating energy consumed on the previous stroke and the hydraulic efficiency.

5. The method of claim 3, further comprising calculating a minimum flywheel speed at a stroke top and at a stroke bottom based upon parameters comprising: energy consumed on the previous stroke, hydraulic efficiency, cylinder stroke speed requirements, stroke length, dwell times and stroke symmetry.

6. A computer implemented program for conducting the steps of the method of claim 3.

* * * * *